(12) United States Patent
Suh et al.

(10) Patent No.: US 8,254,482 B2
(45) Date of Patent: Aug. 28, 2012

(54) PERTURBED DECODER, PERTURBED DECODING METHOD AND APPARATUS IN COMMUNICATION SYSTEM USING THE SAME

(75) Inventors: Jung Hoon Suh, Yongin-si (KR); Sung Jin Kim, Suwon-si (KR); David J. Love, West Lafayette, IN (US); Obadamilola Aluko, West Lafayette, IN (US); James V. Krogmeier, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 1020 days.

(21) Appl. No.: 12/120,212

(22) Filed: May 13, 2008

(65) Prior Publication Data

US 2009/0285342 A1 Nov. 19, 2009

(51) Int. Cl.
*H04L 5/12* (2006.01)
(52) U.S. Cl. ........................ 375/261; 375/346
(58) Field of Classification Search ............... 375/232, 375/261, 297, 329, 341, 346
See application file for complete search history.

(56) References Cited

U.S. PATENT DOCUMENTS

| 6,512,802 | B1 * | 1/2003 | Olivier et al. | 375/329 |
| 6,940,929 | B2 | 9/2005 | Cameron | |
| 6,993,100 | B2 * | 1/2006 | Yang et al. | 375/342 |
| 7,433,416 | B1 * | 10/2008 | Banister | 375/267 |
| 2005/0243946 | A1 * | 11/2005 | Chung et al. | 375/297 |
| 2008/0123764 | A1 * | 5/2008 | McNamara et al. | 375/261 |
| 2009/0323795 | A1 * | 12/2009 | Stirling-Gallacher | 375/232 |
| 2010/0304666 | A1 * | 12/2010 | Hottinen et al. | 455/7 |

FOREIGN PATENT DOCUMENTS

| WO | WO 99/53663 | 10/1999 |
| WO | WO 03/098823 | 11/2003 |

OTHER PUBLICATIONS

David J. Love et al., "Space-time chase decoding," *IEEE Trans. on Wireless Comm.*, vol. 4, No. 5, pp. 2035-2039, Sep. 2005.
Quentin H. Spencer et al., "Zero-forcing methods for downlink spatial multiplexing in multiuser MIMO channels," *IEEE Trans. on Signal Processing*, vol. 52, No. 2, pp. 461-471, Feb. 2004.
James (Sungjin) Kim et al., "On the performance of multiuser MIMO systems in wcdma/hsdpa: Beamforming, feedback and user diversity," *IEICE Trans. on Communications*, vol. E89-B, No. 8, pp. 2161-2169, Aug. 2006.
Bertrand M. Hochwald et al., "Achieving near-capacity on a multiple-antenna channel," *IEEE Trans. Commun.*, vol. 51, No. 3, pp. 389-399, Mar. 2003.
Robert W. Heath Jr. et al., "Multiuser diversity for MIMO wireless systems with linear receivers," *IEEE*, pp. 1194-1199, Apr. 2001.
Babak Hassibi et al., "High-rate codes that are linear in space and time," *IEEE Transactions on Information Theory*, vol. 48, No. 7, pp. 1804-1824, Jul. 2002.

* cited by examiner

*Primary Examiner* — Leon-Viet Nguyen
(74) *Attorney, Agent, or Firm* — NSIP Law (57) ABSTRACT

A decoder adopted to receive a signal transmitted in a communication system, includes one or more of a module adopted to pre-process a received signal to reduce the effect of interference-plus-noise on the received signal before filtering the received signal, and a module adopted to post-process the result of filtering the received signal.

23 Claims, 1 Drawing Sheet

100

PERTURBED DECODER, PERTURBED DECODING METHOD AND APPARATUS IN COMMUNICATION SYSTEM USING THE SAME

TECHNICAL FIELD

Apparatuses, methods and/or systems consistent with the following description relate to a decoder, decoding method and an apparatus in a communication system using the same, and more particularly, the description relates to a perturbed decoder, perturbed decoding method and an apparatus in a multiple-input multiple-output (MIMO) wireless system using the same.

BACKGROUND

MIMO wireless systems are known to provide considerable gains in data rates and diversity advantage over single antenna systems. Effective decoders are needed for multi-antenna systems that operate at these high data rates. Taking full advantage of the optimal performance in MIMO systems usually requires the use of a maximum-likelihood (ML) decoding. However, the complexity of the optimum ML decoder grows exponentially with the number of transmit antennas and the symbol constellation size. Accordingly, there has been a need for decoders that achieve a reasonable trade-off between complexity and performance.

Some of the decoders that tried to achieve this trade-off attempt to modify an initial estimate of a transmit symbol vector, for example in space-time chase decoding and list-sphere decoding. The space-time chasing decoding is described, e.g., in D. J. Love, S. Hosur, A. Batra and R. W. Heath, "Space-time chase decoding," IEEE Trans. on Wireless Comm., 4(5):2035-2039, 2005 (Love et al.), and the list-sphere decoding is described, e.g., in B. Hochwald and S. T. Brink, "Achieving near-capacity on a multiple-antenna channel," IEEE Trans. Comm., 51:389{399, March 2002 (Hochwald et al.) and in B. Hassibi and B. Hochwald, "High rate codes that are linear in space and time," IEEE Transactions on Information Theory, 48(7):1804-1824, July 2002 (Hassibi et al.). These references are incorporated herein by reference in its entirety for all purposes. These decoders may be considered as performing some sort of post-processing on a filtered received symbol vector.

In space-time chase decoding in Love et al., it was shown that there is an improvement in performance of a zero-forcing (ZF) decoder with the addition of space-time chase decoding techniques. A list sphere decoder (LSD) in Hochwald et al. and/or Hassibi et al. attempts to search for the ML estimate by considering only transmit symbol vectors that are within a radius from a ZF estimate. The limitations and drawbacks of the LSD are based on the aspect that the performance is dependent on the search radius. Moreover, it may not be considered in a multiuser scenario.

Accordingly, there is a need for new decoders, decoding methods, and apparatuses and systems using the same.

SUMMARY

According to an aspect, there is provided a decoder which perturbs the result of filtering a received signal. The decoder may be referred to as, for example, a post-perturbed decoder. The decoder may be used in a single-user MIMO (SU-MIMO) scenario where a spatial diversity multiplexing (SDM) is used to transmit multiple streams to a single user. The decoder may be used in a multiple-user MIMO (MU-MIMO) scenario where a spatial diversity multiple access (SDMA) is used to transmit multiple streams to multiple users simultaneously. The decoder may improve the performance of linear decoders such as ZF and minimum mean square error (MMSE) decoders by perturbing the result of filtering the received signal. The decoder may create a list of possible transmit symbol vector candidates. With the list, a hard decision decoding may be performed on transmit symbol vectors or a soft decision decoding may be performed for transmitted bits. An outer channel code may be used for increased performance.

According to another aspect, there is provided a decoder which reduces the effects of interference-plus-noise at the decoder before decoding by pre-processing to reduce the effects of interference-plus-noise on a received signal before decoding. The decoder may be referred to as, for example, a pre-perturbed decoder. The decoder may reduce the effects of interference-plus-noise on transmitted symbols by perturbing a received signal before filtering the received signal using. The filtering may be by way of linear decoding. The decoder may be used in multi-antenna systems. With the decoder, a hard decision decoding may be performed on transmit symbol vectors or a soft decision decoding may be performed for transmitted bits. An outer channel code may be used for increased performance.

According to still another aspect, there is provided a decoder which pre-perturbs a received signal and post-perturbs an estimate from filtering the received signal. The decoder may be referred to as, for example, a dual-perturbed decoder. The decoder may be used in a SU-MIMO scenario where a SDM is used to transmit multiple streams to a single user. The decoder may be used in a MU-MIMO scenario where a SDMA is used to transmit multiple streams to multiple users simultaneously. The decoder may create a list of possible transmit symbol vector candidates. With the list, a hard decision decoding may be performed on transmit symbol vectors or a soft decision decoding may be performed for transmitted bits. An outer channel code may be used for increased performance.

According to still another aspect, there is provided a decoder adopted to receive a signal transmitted in a communication system, the decoder comprising a module adopted to provide perturbation vectors, and a module adopted to provide transmit symbol vector candidates by perturbing an estimate of a transmit symbol vector with the perturbation vectors.

The communication system may be a multiple-input multiple-output (MIMO) communication system.

The perturbation vectors may be randomly generated vectors that, on average, are contained within a sphere around the estimate.

The perturbation vectors may be individually added to the estimate and the result mapped to provide the transmit symbol vector candidates.

The decoder may further comprise a module adopted to provide the estimate of the transmit symbol vector by filtering a received vector.

The module adopted to provide the transmit symbol vector candidates may comprises a module adopted to provide transmit symbol vector estimates by individually adding the perturbation vectors to the estimate and a module adopted to provide the transmit symbol vector candidates by mapping the transmit symbol vector estimates to a constellation symbol.

The decoder may further comprise a module adopted to perform a hard decision decoding based on the transmit symbol vector candidates and/or a module adopted to perform a soft decision decoding for received bits based on the transmit symbol vector candidates. The decoder may be adopted to use an outer channel code.

The number of the transmit symbol vector candidates may be less than that of the perturbation vectors.

According to still another aspect, there is provided a decoder adopted to receive a signal transmitted in a communication system, the decoder comprising a module adopted to provide perturbation vectors, and a module adopted to provide processed received vectors by perturbing a received vector with the perturbation vectors.

The perturbation vectors may be randomly generated vectors having a statistical nature corresponding to interference-plus-noise on the received vector.

The perturbation vectors may be individually added to the received vector to provide the processed received vectors.

The decoder may further comprise a module adopted to provide transmit symbol vector estimates by filtering the processed received vectors. The decoder may further comprise a module adopted to provide transmit symbol vector candidates by mapping the transmit symbol vector estimates to a constellation symbol. The decoder may further comprise a module adopted to perform a hard decision decoding based on the transmit symbol vector candidates and/or a module adopted to perform a soft decision decoding for received bits based on the transmit symbol vector candidates.

The decoder may further comprise a module adopted to provide transmit symbol vector candidates by perturbing at least a subset of the transmit symbol vector estimates with post-perturbation vectors. The post-perturbation vectors may be randomly generated vectors that, on average, are contained within a sphere around a transmit symbol vector estimate.

The at least the subset of the transmit symbol vector estimates may be individually added to the post-perturbation vectors and the result mapped to provide the transmit symbol vector candidates.

The module adopted to provide the transmit symbol vector candidates may comprises a module adopted to provide post-transmit symbol vector estimates by individually adding the at least the subset of the transmit symbol vector estimates to the post-perturbation vectors and a module adopted to provide the transmit symbol vector candidates by mapping the post-transmit symbol vector estimates to a constellation symbol.

According to still another aspect, there is provided a decoder adopted to receive a signal transmitted in a multiple-input multiple-output (MIMO) communication system, the decoder comprising one or more of a module adopted to pre-process a received signal to reduce the effect of interference-plus-noise on the received signal before filtering the received signal, and a module adopted to post-process the result of filtering the received signal. The module adopted to post-process provides transmit symbol vector candidates by perturbing the result with perturbation vectors.

According to still another aspect, there is provided an apparatus for receiving and/or transmitting a signal in a communication system, the apparatus comprising a detector, and a decoder adopted to provide transmit symbol vector candidates by perturbing an estimate of a transmit symbol vector with perturbation vectors.

The perturbation vectors may be randomly generated vectors that, on average, are contained within a sphere around the estimate.

The perturbation vectors may be individually added to the estimate and the result mapped to provide the transmit symbol vector candidates.

The decoder may obtain the estimate of the transmit symbol vector provided by filtering a received vector.

According to still another aspect, there is provided an apparatus for receiving and/or transmitting a signal in a communication system, the apparatus comprising a detector, and a decoder adopted to provide processed received vectors by perturbing a received vector with perturbation vectors.

The perturbation vectors may be randomly generated vectors having a statistical nature corresponding to interference-plus-noise on the received vector.

The perturbation vectors may be individually added to the received vector to provide the processed received vectors.

The decoder may obtain transmit symbol vector estimates provided by filtering the processed received vectors.

The decoder may provide transmit symbol vector candidates by mapping the transmit symbol vector estimates to a constellation symbol.

The decoder may be adopted to provide transmit symbol vector candidates by perturbing at least a subset of the transmit symbol vector estimates with post-perturbation vectors. The post-perturbation vectors may be randomly generated vectors that, on average, are contained within a sphere around a transmit symbol vector estimate. The at least the subset of the transmit symbol vector estimates may be individually added to the post-perturbation vectors and the result mapped to provide the transmit symbol vector candidates.

According to still another aspect, there is provided an apparatus for receiving and/or transmitting a signal in a multiple-input multiple-output (MIMO) communication system, the apparatus comprising a detector, and a decoder comprising one or more of a module adopted to pre-process a received signal to reduce the effect of interference-plus-noise on the received signal before filtering the received signal, and a module adopted to post-process the result of filtering the received signal. The module adopted to post-process may provide transmit symbol vector candidates by perturbing the result with perturbation vectors.

According to still another aspect, there is provided a method for use in an apparatus adopted to receive a signal transmitted in a communication system, the method comprising generating perturbation vectors, and generating transmit symbol vector candidates by perturbing an estimate of a transmit symbol vector with the perturbation vectors.

The generating of the perturbation vectors may comprise randomly generating vectors that, on average, are contained within a sphere around the estimate.

The generating of the transmit symbol vector candidates may comprise individually adding the perturbation vectors to the estimate and mapping the result thereof.

The method may further comprise obtaining the estimate of the transmit symbol vector provided by filtering a received vector.

The generating of the transmit symbol vector candidates may comprises individually adding the perturbation vectors to the estimate to obtain transmit symbol vector estimates, and mapping the transmit symbol vector estimates to a constellation symbol to generate the transmit symbol vector candidates.

The method may further comprise performing a hard decision decoding based on the transmit symbol vector candidates.

The method may further comprise performing a soft decision decoding for received bits based on the transmit symbol vector candidates.

According to still another aspect, there is provided a method for use in an apparatus adopted to receive a signal transmitted in a communication system, the method comprising generating perturbation vectors, and generating processed received vectors by perturbing a received vector with the perturbation vectors.

The generating of perturbation vectors may comprise randomly generating vectors having a statistical nature corresponding to interference-plus-noise on the received vector.

The generating of the processed received vectors may comprise individually adding the perturbation vectors to the received vector.

The method may further comprise obtaining transmit symbol vector estimates provided by filtering the processed received vectors.

The method may further comprise generating transmit symbol vector candidates by mapping the transmit symbol vector estimates to a constellation symbol.

The method may further comprise generating transmit symbol vector candidates by perturbing at least a subset of the transmit symbol vector estimates with post-perturbation vectors. The post-perturbation vectors may be randomly generated vectors that, on average, are contained within a sphere around a transmit symbol vector estimate.

The generating of the transmit symbol vector candidates may comprise individually adding the at least the subset of the transmit symbol vector estimates to the post-perturbation vectors and mapping the result thereof.

The generating of the transmit symbol vector candidates may comprises generating post-transmit symbol vector estimates by individually adding the at least the subset of the transmit symbol vector estimates to the post-perturbation vectors, and generating the transmit symbol vector candidates by mapping the post-transmit symbol vector estimates to a constellation symbol.

According to still another aspect, there is provided a computer-readable storage medium storing a program for implementing a method for use in an apparatus adopted to receive a signal transmitted in a communication system, the method comprising generating perturbation vectors, and generating transmit symbol vector candidates by perturbing an estimate of a transmit symbol vector with the perturbation vectors.

According to still another aspect, there is provided a computer-readable storage medium storing a program for implementing a method for use in an apparatus adopted to receive a signal transmitted in a communication system, the method comprising generating perturbation vectors, and generating processed received vectors by perturbing a received vector with the perturbation vectors. The method may further comprise obtaining transmit symbol vector estimates provided by filtering the processed received vectors, and generating transmit symbol vector candidates by perturbing at least a subset of the transmit symbol vector estimates with post-perturbation vectors.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawing and the detailed description, the same drawing reference numerals will be understood to refer to the same elements, features, and structures.

DETAILED DESCRIPTION

The following detailed description is provided to assist the reader in gaining a comprehensive understanding of the apparatuses, methods and systems described herein. Accordingly, various changes, modifications, and equivalents of the systems, apparatuses and methods described herein will be suggested to those of ordinary skill in the art. Also, descriptions of well-known functions and constructions are omitted to increase clarity and conciseness.

Decoders, apparatuses and/or methods consistent with the disclosures and teachings provided herein may be applied to a variety of known or to be known communication system including a MIMO communication system such as a MIMO wireless communication system and a MIMO wire line communication system, single-input multiple-output (SIMO) communication system, multiple-input single-output (MISO) communication system, cooperative MIMO system, and the like. As an illustration, and without limiting thereto, a MIMO wireless communication system may include a single-user MIMO wireless system and a multiple-user MIMO wireless system. As an illustration, and without limiting thereto, a MIMO wire line communication system may include a digital subscriber line (DSL) system such as a gigabit DSL system based on binder MIMO channels. The disclosures and teachings provided herein may also be applied to and/or adopted by various known and to be known standards and/or standard setting organizations including, and without limiting thereto, IEEE 802.x standards, worldwide interoperability for microwave access (WiMAX) broadband mobile standards, 3G mobile standards, mobile radio telephone standards such as 3GPP and 3GPP2 standards, long term evolution (LTE) standards, wireless broadband (WiBro) standards, wideband code division multiple access (WCDMA) standards, high-speed packet access plus (HSPA+) standards, and the like. Accordingly, a system/channel model described below is only exemplary. In it a multiple-user communication system is considered, which subsumes a single-user point-to-point MIMO channel.

Figure 1:
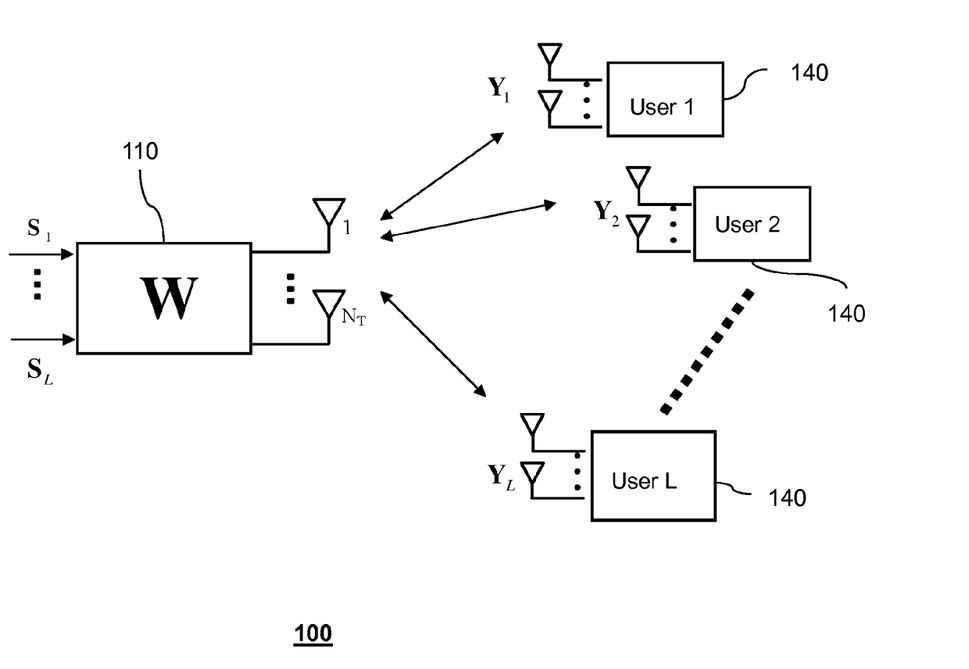
FIG. 1 is a configuration diagram illustrating an exemplary multiuser MIMO system utilizing a decoder and/or decoding method according to an exemplary embodiment.

FIG. 1 illustrates an exemplary MU-MIMO system 100 comprising a base station 110 and users 140. It is understood that a base station (or an access point) and a user may refer to a transmitter and a receiver, respectively, for downlink environments, whereas the base station and the user may refer to a receiver and a transmitter, respectively, for uplink environments. It is also understood that, while not illustrated in FIG. 1, a receiver/transmitter may comprise a detector to detect a signal transmitted in the MU-MIMO system 100, transmitter unit, receiver unit, and/or transceiver unit, as the cases may be, and a processor and/or decoder that carries out a decoding method and/or algorithm according to certain exemplary embodiments disclosed herein. As an illustration, and without limiting thereto, a receiver/transmitter may be a mobile/cellular phone, personal digital assistant (PDA), portable computer, portable media player (PMP), and the like, and as the cases may be, may be an access point (AP), base station, terminal, router, and the like. As an illustration, and without limiting thereto, a decoder may be implemented by hardware and/or software using known or to be known methods and comprise one or more modules adopted to carry out a decoding method and/or algorithm according to certain exemplary embodiments disclosed herein. It is understood and within one skilled in the art that, for example, operations carried out by several modules may be adopted to be carried out by one equivalent module and vice versa.

FIG. 1 shows both uplink and downlink transmissions. In downlink transmission, the base station 110 may transmit to multiple users 140 simultaneously. In uplink transmission, multiple users 140 may transmit simultaneously to the base station 110. Referring to FIG. 1, consider a downlink of a multiuser channel for which the base station 110 is equipped with $N_T$ transmit antennas which communicate with L users 140. User l, l=1, ..., L, is equipped with $N_{R_l}$ receive antennas. A notation $\{N_{R_1}, N_{R_2}, \ldots, N_{R_L}\} \times N_T$ may be used to refer to such a channel. A received signal at user l may be modeled by the following input-output relation $$Y_l = \sqrt{\frac{E_s}{N_T}} H_l^{act} W_l S_l + \sum_{\substack{i=1 \\ i \neq l}}^{L} H_l^{act} W_i S_i + V_l,$$

$$= \sqrt{\frac{E_s}{N_T}} H_l \underline{S} + V_l.$$

Where $L \leq N_T$ and $H_l = H_l^{act} W$ is the effective channel matrix for user l. It is derived by the use of a unitary precoder matrix, $W = [W_1, \ldots, W_L]$, on the actual channel matrix for user l, $H_l^{act}$. $\underline{S} = [S_1^T, \ldots, S_L^T]^T$ is the $N_T \times 1$ symbol vector transmitted to users 140 from the base station 110, such that $E\{\underline{S}\} = 0$ and $E\{\underline{S}^*\underline{S}\} = N_T$. Let each element of $\underline{S}$ be drawn independently from a complex constellation C. $V_l$ is additive white Gaussian noise $CN(0, I_{N_{R_l}})$. It may be assumed that user l has no knowledge of the channel matrix from the base station 110 to any other user.

Various precoder design techniques for W have been investigated. In a ZF precoding method in e.g., Q. H. Spencer, A. L. Swindlehurst, and M. Haardt, "Zero-forcing methods for downlink spatial multiplexing in multiuser MIMO channels," IEEE Trans. on Signal Processing, 52(2):461-471, February 2004, the reference of which is incorporated herein by reference in its entirety for all purposes, a block diagonalization (BD) algorithm is considered. With this approach, full transmitter channel side information (CSIT) for all users is assumed. The precoder for each user is selected so that it may fall within the null space of every other users channel matrix. In theory, all multi-user interference is eliminated for all users in the system, and the resulting channel is equivalent in performance to a point-to-point MIMO channel (i.e., single user).

In reality, it is difficult for a base station to have perfect CSIT due to the delayed and lossy characteristics of a feedback link. In this case, precoders $W_l$ could be chosen as in e.g., D. J. Love, R. W. Heath, and T. Strohmer, "Grassmanian beamforming for multiple-input multiple-output wireless systems," IEEE Trans. on Information Theory, 49(10):2735-2747, October 2003, the reference of which is incorporated herein by reference in its entirety for all purposes, from a finite set codebook, where the codebook is designed using a Grassmannian line packing. In addition, user scheduling and antenna selection may be used to obtain additional achievable throughput, as in e.g., S. J. Kim, H. Kim, C. S. Park, and K. B. Lee, "On the performance of multiuser MIMO systems in WCDMA/HSDPA: Beamforming, feedback and user diversity," IEICE Trans. on Communications, E89-B(8):2161-2169, August 2006 and R. W. Heath, M. Airy, and A. J. Paulraj, "Multiuser diversity for MIMO wireless systems with linear receivers," IEEE Communications Letters, 5(4):142-144, April 2001, the references of which are incorporated herein by reference in its entirety for all purposes. This is achieved by the use of a multiuser MIMO scheme that is called a per-user unitary beamforming and rate control (PU2RC). Here, the constraint placed on W may be such that $W^*W = I_{N_T}$.

Certain embodiment including decoders and decoding methods according to exemplary embodiments are further disclosed below.

Post-Perturbed Decoder and Decoding Method

A post-perturbed decoder according to an exemplary embodiment may be used for, for example, either a full feedback or a limited feedback. According to an aspect, the post-perturbed decoder, which may also be referred to as a post-perturbed sphere-like decoder, aims to achieve a performance edge over linear filters such as ZF and MMSE decoders in SU-MIMO systems and for uplink and down link transmissions in MU-MIMO systems. As taught herein, the complexity of the post-perturbed decoder is less than that of a ML decoder which requires an exhaustive search. A list of possible transmit symbol vector candidates provided by the post-perturbed decoder may be used for a hard decision using, for example, a minimum distance decoding. The list may also be used for a soft decision decoding for which the performance may be further improved by the use of an outer channel code. An exemplary method of generating the list is described below.

According to an aspect, the post-perturbed decoder attempts to find a ML estimate from an estimate of a transmit symbol vector. This is achieved by perturbing a transmit symbol vector estimate, that is, an estimate of a transmit symbol vector, with randomly generated vectors that, on average, are contained within a sphere around the estimate provided by a linear decoder. Linear decoders such as ZF and MMSE decoder may be used on a received vector to compute the transmit symbol vector estimate. The randomly generated vectors are individually added to this estimate and mapped to form a list of possible transmit symbol vector candidates. According to another aspect, based on the list, a minimum distance decoding may be performed as in the case of a ML or soft information on transmitted bits may be generated.

The decoder according to an exemplary embodiment generates K perturbation vectors and forms a set $P = \{P_0, P_1, \ldots, P_K\}$, such that $P_0$ is the all zeros vector. The perturbation vectors may be generated as random vectors with statistical nature such that on average they fit within a sphere around an estimate. For example, to fit within a sphere of radius $\sqrt{E_P}$ around the estimate, the vectors may be generated as $CN(0, E_P I_{N_T})$.

For each user, a received vector $Y_l$ is processed by a linear filter to obtain an estimate of the transmit symbol vector, $Z_{est}$.

$$Z_{est} = GY_l.$$

Where $G \in \{G_{ZF}, G_{MMSE}\}$ is either a ZF or MMSE decoding matrix. This estimate is individually added to the perturbation vectors to form a set $Z = \{Z_0, \ldots, Z_K\}$. Where, $$Z_k = Z_{est} + P_k \text{ for } k = 0, \ldots, K.$$

Each element in Z is mapped to the closest constellation symbol in C. This mapping creates a set of possible transmit symbol vector candidates, $\hat{S} = \{\hat{S}_0, \hat{S}_1, \ldots, \hat{S}_K\}$, such that $$\hat{S}_k = \text{map}(Z_k) = \begin{bmatrix} \text{map}(z_{k,1}) \\ \text{map}(z_{k,2}) \\ \vdots \\ \text{map}(z_{k,N_T}) \end{bmatrix}.$$

Where $\text{map}(z) = \underset{s \in C}{\text{argmin}} |z - s|^2$.

Some transmit symbol vector estimates, $Z_k$, might map into the same transmit symbol vector candidates in $\hat{S}$. Thus, $$\hat{S} = \{\hat{S}_0, \hat{S}_1, \ldots, \hat{S}_M\} M \leq K.$$

This list of possible transmit symbol vector candidates may be used as a search space for a hard maximum likelihood decision. In this case, the output of the post-perturbed decoder, $\hat{S}_l^{PPD}$ may be calculated as $$\hat{S}_l^{PPD} = \underset{m=1,\ldots,M}{\operatorname{argmin}} \left\| Y - \sqrt{\frac{E_s}{N_T}} H_l \hat{S}_m \right\|^2.$$

The list may also be used to provide soft information on bits that make up the transmitted symbol vector. Hence, a soft decision decoding may be performed on received bits. The performance of the decoder may be further improved by using it in concatenation with an "outer" channel code, e.g., a convolutional code, turbo code and the like. The soft information may computed as a log-likelihood ratio (LLR) which is given by $$LLR(bit_i) = \ln \left( \frac{\sum_{X \in \tilde{S}_{i,1}} \left\| Y_l - \sqrt{\frac{E_s}{N_T}} H_l X \right\|^2}{\sum_{X \in \tilde{S}_{i,0}} \left\| Y_l - \sqrt{\frac{E_s}{N_T}} H_l X \right\|^2} \right)$$

Where $\tilde{S}_{i,1}$ is the subset of $\hat{S}$ that contains symbol vectors that have a "1" in the $i^{th}$ bit position and $\tilde{S}_{i,0}$ is the subset of $\hat{S}$ that contains symbol vectors that have a "0" in the $i^{th}$ bit position.

A post-perturbed decoder algorithm according to an exemplary embodiment is described below.

Obtain a transmit symbol vector estimate, $Z_{est}$, by the use of a linear decoder.

$Z_{est} = GY_l$.

Where $G \in \{G_{ZF}, G_{MMSE}\}$ and $G_{ZF} = (H_l^* H_l)^{-1} H_l^*$.

$G_{MMSE} = \left[ H_l^* H_l + \frac{N_T}{E_s} I_{N_T} \right]^{-1} H_l^*$.

Generate K random perturbation vectors, $P=\{P_0, P_1, \ldots, P_K\}$ such that $P_0$ is the all zeros vector.

Create a set of transmit symbol vector estimates by perturbing $Z_{est}$ with the vectors in P.

$Z_k = Z_{est} + P_k$.

Generate a list $\hat{S} = \{\hat{S}_0, \hat{S}_1, \ldots, \hat{S}_M\}$, such that $\hat{S}_m = \operatorname{map}(Z)$ m=1, ..., $M \leq K$. Perform a maximum likelihood "hard" decoding or a "soft" decoding from the list $\hat{S}$. The performance of the post-perturbed decoder may be dependent on the number of perturbation vectors, K, which in turn determines the size of the list of possible transmit symbol vector candidates. Each perturbation vector may not map in a one-to-one pattern to transmit symbol vectors. Some of the perturbations may map to the same unique transmit symbol vector. Accordingly, the size of the eventual list of transmit symbol vector candidates is usually less than the number of perturbation vectors used.

Pre-Perturbed Decoder and Decoding Method

A pre-perturbed decoder according to an exemplary embodiment may be used for, for example, either a full feed-back or a limited feed-back. According to an aspect, statistics, e.g., mean and variance, of interference-plus-noise may be known at a receiver. And the pre-perturbed decoder attempts to mitigate the effect of interference-plus-noise on a transmitted signal vector at the receiver. This is achieved by perturbing a received signal with randomly generated vectors that have the same statistics as the unknown interference-plus-noise. According to another aspect, linear decoders such as ZF and MMSE decoders may used on the pre-processed perturbed vectors to compute the possible transmit symbol vector candidates. Accordingly, a minimum distance decoding may be performed as in the case of the ML or soft information on transmitted bits may be generated.

The decoder according to an exemplary embodiment generates K perturbation vectors and forms a set $\tilde{P} = \{P_0, \ldots, P_K\}$, such that $P_0$ is the all zeros vector. The perturbation vectors may be generated as random vectors with the same statistical nature as the interference-plus-noise. For example, in a point-to-point MIMO system with a single user, the elements of $\tilde{P}$ are $CN(0, I_{N_T})$. However in the multiuser case, the elements of $\tilde{P}$ are $CN(0, \sigma^2)$, where $\sigma^2$ is the variance of the interference-plus-noise component.

A received vector Y is pre-processed by individually adding to it the perturbation vectors $P_0, \ldots, P_K$ and forming a set $\tilde{Y} = \{Y_0, \ldots, Y_K\}$, that is, processed received vectors.

$Y_k = Y + P_k, k=0, \ldots, K$.

In this case, for example, ZF and MMSE linear receivers may be used for which $G_{ZF} = [H_l^* H_l]^{-1} H_l^*$ and $G_{MMSE} = \left[ H_l^* H_l + \frac{N_T}{E_s} I_{N_T} \right]^{-1} H_l^*$.

For either choice of linear receiver, a set of transmit symbol vector estimates $Z_k = GY_k$, k=0, ..., K, is formed. Where $G \in \{G_{ZF}, G_{MMSE}\}$.

Each element in each symbol vector is mapped to the closest constellation symbol. This mapping creates a set of possible transmit symbol vector candidates, $\tilde{S}$.

$$\tilde{S}_k = \operatorname{map}(Z_k) = \begin{bmatrix} \operatorname{map}(z_{k,1}) \\ \operatorname{map}(z_{k,2}) \\ \vdots \\ \operatorname{map}(z_k, N_T) \end{bmatrix}$$

Where $\operatorname{map}(z) = \underset{s \in C}{\operatorname{argmin}} |z - s|^2$.

Some transmit symbol vector estimates, $Z_k$, might map into the same transmit symbol vector candidates in $\tilde{S}$. Thus, $\tilde{S} = \{\tilde{S}_1, \ldots, \tilde{S}_M\}$, $M \leq K$. This list of possible symbol vector candidates may be used as a search space for a hard maximum likelihood decision. In this case, the output of the pre-perturbed decoder, $\tilde{S}_{PPD}$, may be calculated as $$\hat{S}_l^{PPD} = \underset{m=1,\ldots,M}{\operatorname{argmin}} \left\| Y - \sqrt{\frac{E_s}{N_T}} H_l \tilde{S}_m \right\|^2.$$

In a single-user scenario, the list may also be used to create soft information on bits that make up the transmitted symbol vector. Hence, a soft decision decoding may be performed on received bits. The performance of the decoder may be further improved by using it in concatenation with an "outer" channel code, e.g., a convolutional code, turbo code and the like. The soft information may be computed as a log-likelihood ratio (LLR) which is given by $$LLR(bit_i) = \ln\left(\frac{\sum_{X \in \tilde{S}_{i,1}} \|Y_l - H_l^{act} X\|_2^2}{\sum_{X \in \tilde{S}_{i,0}} \|Y_l - H_l^{act} X\|_2^2}\right).$$

Where $\tilde{S}_{i,1}$ is the subset of $\tilde{S}$ that contains symbol vectors that have a "1" in the $i^{th}$ bit position and $\tilde{S}_{i,0}$ is the subset of $\tilde{S}$ that contains symbol vectors that have a "0" in the $i^{th}$ bit position.

A pre-perturbed decoder algorithm according to an exemplary embodiment is described below.

Generate K random perturbation vectors, $P_1, \ldots, P_K$.

Form a set $\tilde{P} = \{P_0, P_1, \ldots, P_K\}$ such that $P_0$ is the all zeros vector.

Create a set of processed received vectors, $\tilde{Y} = \{Y_0, \ldots, Y_K\}$ by perturbing Y with the vectors in $\tilde{P}$. Where, $Y_k = Y + P_k$. k+0, ..., K.

Use a linear decoder on the vectors in $\tilde{Y}$ to create a list of transmit symbol vector estimates, $Z_k$. $Z_k = GY_k$. k=0, ..., K. Where $G \in \{G_{ZF}, G_{MMSE}\}$.

Generate a list $\tilde{S} = \{\tilde{S}_1, \ldots, \tilde{S}_M\}$, such that $\tilde{S}_m = \text{map}(Z)$, m=1, ..., M≤K. It is possible that some estimates will map to the same transmit symbol vector.

Perform a maximum likelihood (ML) decoding or a soft decoding over $\tilde{S}$.

The performance of the pre-perturbed decoder may be dependent on the number of perturbation vectors, K, which in turn determines the size of the list of possible transmit symbol vector candidates. Each perturbation vector may not map in a one-to-one pattern to transmit symbol vectors. Some of the perturbations may map to the same unique transmit symbol vector. Accordingly, the size of the eventual list of transmit symbol vector candidates is usually less than the number of perturbation vectors used.

Dual-Perturbed Decoder and Decoding Method

A dual-perturbed decoder according to an exemplary embodiment may be used for, for example, either a full feedback or a limited feedback. According to an aspect, the dual-perturbed decoder aims to achieve a performance edge over linear filters such as ZF and MMSE decoders in SU-MIMO systems and for uplink and down link transmissions in MU-MIMO systems. As taught herein, the complexity of the dual-perturbed decoder, which may also be referred to as a dual-perturbed sphere-like decoder, is less than that of a ML decoder which requires an exhaustive search. A list of possible transmit symbol vector candidates provided by the dual-perturbed decoder, may be used for a hard decision, for example, using a minimum distance decoding. The list may also be used for a soft decision decoding for which the performance may be further improved by the use of an outer channel code. An exemplary method of generating this list is described below.

According to an aspect, the dual-perturbed decoder attempts to find a ML estimate by a combination of pre-processing, and post-processing of estimates obtained by a linear decoder. Pre-processing may be achieved by perturbing a received signal to prevent interference and noise. Post-processing may be achieved by perturbing the estimates obtained from pre-processing with randomly generated vectors that, on average, are contained within a sphere around the estimate provided by a linear decoder.

A received signal vector may be processed by randomly generated pre-perturbation vectors. The result of each perturbation is fed into a linear decoder such as a ZF decoder or a MMSE decoder. These decoders may provide a transmit symbol vector estimate for each perturbation. The randomly generated post-perturbation vectors are individually added to these estimates and mapped to form a list of possible transmit symbol vector candidates. Accordingly, a minimum distance decoding may be performed as in the case of the ML or soft information on transmitted bits may be generated.

The decoder according to an exemplary embodiment generates $K_1$ pre-perturbation vectors and forms a set $P_1 = \{P_{1,0}, P_{1,1}, \ldots, P_{1,K_1}\}$, such that $P_{1,0}$ is the all zeros vector. $P_{1,k_1} \in C^{N_{Rl}}$ is generated such that it has the same statistical characteristics as the interference-plus-noise. Post-perturbation vectors, $P_2 = \{P_{2,0}, P_{2,1}, \ldots, P_{2,K_1}\}$, are also generated as random vectors with statistical nature such that on average they fit within a sphere around a transmit symbol vector estimate. For example, to fit within a sphere of radius $\sqrt{E_P}$ around the estimate, the vectors could be generated as $CN(0, E_p I_{N_T})$.

For each user, a received vector $Y_l$, is pre-processed by individually perturbing by the vectors in $P_1$. This forms a set $\underline{Y} = \{Y_0, \ldots, Y_{K_1}\}$ such that $$Y_{k_1} = Y_l + P_{1,k_1}. k_1 = 0, 2, \ldots, K_1.$$

Each perturbed vector in $\underline{Y}$ is processed by a linear filter to obtain an estimate of the transmit symbol vector. This list of transmit symbol vector estimates $\underline{Z}$ is generated such that.

$$\underline{Z} = \{Z_{k_1} : Z_{k_1} = G Y_{k_1}\}.$$

Where $G \in \{G_{ZF}, G_{MMSE}\}$ is either a ZF or MMSE decoding matrix. Each estimate in $\underline{Z}$ is individually added to the post-perturbation vectors, $P_2$, to form the set $\hat{\underline{Z}} = \{\hat{Z}_0, \hat{Z}_1, \ldots, \hat{Z}_{K_2}\}$, that is, post-transmit symbol vector estimates. Where, $$\hat{\underline{Z}}_{k_2} = \{\hat{Z}_{k_1,k_2} : \hat{Z}_{k_1,k_2} = Z_{k_1} + P_{2,k_2}\} \text{ for } k_1 = 0, \ldots, K_1 \text{ and } k_2 = 0, \ldots, K_2.$$

Each element in $\hat{Z}$ is mapped to the closest constellation symbol in C. This mapping creates a set of possible transmit symbol vector candidates, $\hat{S} = \{\hat{S}_0, \hat{S}_1, \ldots, \hat{S}_K\}$, such that $$\hat{S}_k = \text{map}(\hat{Z}_k) = \begin{bmatrix} \text{map}(\hat{z}_{k,1}) \\ \text{map}(\hat{z}_{k,2}) \\ \vdots \\ \text{map}(\hat{z}_{k,N_T}) \end{bmatrix}.$$

Where $\text{map}(z) = \underset{s \in C}{\text{argmin}} |z - s|^2$.

This list of possible symbol vector candidates may be used as a search space for a hard maximum likelihood decision. In this case, the output of the dual-perturbed decoder, $\hat{S}_l^{DP}$, may be calculated as $$\hat{S}_l^{DP} = \underset{\hat{S}_m \in \hat{S}}{\text{argmin}} \left\| Y_l - \sqrt{\frac{E_s}{N_T}} H_l \hat{S}_m \right\|^2.$$

The list may also be used to create soft information on bits that make up the transmitted symbol vector. Hence, a soft decision decoding may be performed on received bits. The performance of the decoder may be improved by using it in concatenation with an "outer" channel code, e.g., a convolutional code, turbo code and the like. The soft information may be computed as a log-likelihood ratio (LLR) which is given by $$LLR(bit_i) = \ln\left(\frac{\sum_{X \in \tilde{S}_{i,1}} \left\|Y_l - \sqrt{\frac{E_s}{N_T}} H_l X\right\|^2}{\sum_{X \in \tilde{S}_{i,0}} \left\|Y_l - \sqrt{\frac{E_s}{N_T}} H_l X\right\|^2}\right)$$

Where $\tilde{S}_{i,1}$ is the subset of $\hat{S}$ that contains symbol vectors that have a "1" in the $i^{th}$ bit position and $\tilde{S}_{i,0}$ is the subset of $\hat{S}$ that contains symbol vectors that have a "0" in the $i^{th}$ bit position.

A dual-perturbed decoder algorithm according to an exemplary embodiment is described below.

Generate a set of pre-perturbed vectors, $P_1=\{P_{1,0}, P_{1,1}, \ldots, P_{1,K_1}\}$.

Create a list $\underline{Y}=\{Y_0, \ldots, Y_{K_1}\}$ by pre-processing a received signal, $Y_l$, such that $Y_{k_1}=Y_l+P_{1,k_1}$ for $k_1=0,1,\ldots,K_1$.

Obtain a transmit symbol vector estimate for each vector in $\underline{Y}$ by the use of a linear decoder. Let this list be $\underline{Z} = \{Z_k : Z_k = GY_k\}$.

Where $G \in \{G_{ZF}, G_{MMSE}\}$ and $G_{ZF} = [(H_l H_l^*)^{-1} H_l]^*$.

$G_{MMSE} = \left[\left(H_l H_l^* + \frac{N_T}{E_s} I_{N_{R_l}}\right)^{-1} H_l\right]^*$.

Generate $K_2$ random vectors, that is, post-perturbation vectors $P_2=\{P_{2,0}, P_{2,1}, \ldots, P_{2,K_2}\}$ such that $P_{2,0}$ is the all zeros vector.

Create a set of transmit symbol vector estimates, that is, post-transmit symbol vector estimates, by perturbing $\underline{Z}$ with vectors in $P_2$. This post-perturbed list $\underline{\hat{Z}}=\{\underline{\hat{Z}}_0, \underline{\hat{Z}}_1, \ldots, \underline{\hat{Z}}_{K_2}\}$ is created such that $\underline{\hat{Z}}_{k_2}=\{\hat{Z}_{k_1,k_2} : \hat{Z}_{k_1,k_2}=Z_{k_1}+P_{2,k_2}\}$.

Generate a list $\hat{S}=\{\hat{S}_0, \hat{S}_1, \ldots, \hat{S}_M\}$, such that $\hat{S}_m=\text{map}(\underline{\hat{Z}}) m=1, \ldots, M \leq K_1 K_2$.

Perform a maximum likelihood "hard" decoding or a "soft" decoding from the list $\hat{S}$.

The performance of the dual-perturbed decoder may be dependent on the number of perturbation vectors, $K_1$ and $K_2$, which in turn determines the size of the list of possible transmit symbol vector candidates. Each perturbation vector may not map in a one-to-one pattern to transmit symbol vectors. Some of the perturbations may map to the same unique transmit symbol vector. Accordingly, the size of the eventual list of transmit symbol vector candidates is usually less than the number of perturbation vectors used.

Without a list constraint, the size of the dual-perturbed transmit symbol vector estimate list may grow as large as $K_1 K_2$, which may sometimes be redundant since it may be as large as an exhaustive search. Accordingly, according to another aspect, the list size may be constrained after the pre-processing. This may be achieved by, for example, picking a subset with the most reliable estimates after the pre-processing. Post-perturbing may be provided with respect to the vectors in this subset. For example, 10 closest transmit symbol vector estimates may be chosen after a pre-perturbation, and post-perturbation may be performed on this subset.

The methods described herein including the post-perturbed, pre-perturbed, and dual-perturbed decoding method and the corresponding algorithms may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to certain embodiments described above, decoders are provided that may improve the performance of linear decoders such as ZF and MMSE decoders. According to an aspect, the complexity of the decoder is less than is typically required for an exhaustive search in a ML decoding. However, the performance of the decoders may generally be better than the performance of using only the linear decoders.

It is understood that the terminology used herein, for example, a transmit symbol vector and perturbed, may be different in other applications or when described by another one skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A decoder adopted to receive a signal transmitted in a communication system, the decoder comprising:
   a module adopted to utilize a linear decoder to filter a received vector to provide an estimate of a transmit symbol vector;
   a module adopted to provide randomly generated perturbation vectors, wherein the randomly generated perturbation vectors are contained within a sphere around the estimate; and
   a module adopted to provide transmit symbol vector candidates by perturbing the estimate of the transmit symbol vector with the randomly generated perturbation vectors, wherein the module adopted to provide the transmit symbol vector candidates comprises:

a module adopted to provide transmit symbol vector estimates by individually adding the randomly generated perturbation vectors to the estimate; and a module adopted to provide the transmit symbol vector candidates by mapping the transmit symbol vector estimates to a constellation symbol.

2. The decoder of claim 1, wherein the communication system is a multiple-input multiple-output (MIMO) communication system.

3. The decoder of claim 1, wherein the perturbation vectors are individually added to the estimate and the result mapped to provide the transmit symbol vector candidates.

4. The decoder of claim 1, further comprising a module adopted to perform a hard decision decoding based on the transmit symbol vector candidates.

5. The decoder of claim 1, further comprising a module adopted to perform a soft decision decoding for received bits based on the transmit symbol vector candidates.

6. The decoder of claim 1, wherein a number of the transmit symbol vector candidates is less than that of the perturbation vectors.

7. A decoder adopted to receive a signal transmitted in a communication system, the decoder comprising:

a module adopted to utilize a linear decoder to filter a processed received vector to provide transmit symbol vector estimates;

a module adopted to provide randomly generated perturbation vectors, wherein the randomly generated perturbation vectors are contained within a sphere around the estimates;

a module adopted to provide the processed received vectors by perturbing the received vector with the randomly generated perturbation vectors; and a module adopted to provide transmit symbol vector candidates which comprises:

a module adopted to provide transmit symbol vector estimates by individually adding the randomly generated perturbation vectors to the estimate; and a module adopted to provide the transmit symbol vector candidates by mapping the transmit symbol vector estimates to a constellation symbol.

8. The decoder of claim 7, further comprising a module adopted to provide transmit symbol vector candidates by perturbing at least a subset of the transmit symbol vector estimates with post-perturbation vectors.

9. A method for use in an apparatus adopted to receive a signal transmitted in a communication system, the method comprising:

generating perturbation vectors, randomly;

utilizing a linear decoder to filter a processed received vector to generate transmit symbol vector candidates estimates by individually adding the randomly generated perturbation vectors to the estimate, wherein the randomly generated perturbation vectors are contained within a sphere around the estimates;

providing transmit symbol candidates by perturbing at least a subset of the transmit symbol vector estimates with post-perturbation vectors and by mapping the transmit symbol vector candidate estimates to a constellation symbol; and providing the processed received vectors by perturbing the received vector with the randomly generated perturbation vectors.

10. A method for use in an apparatus adopted to receive a signal transmitted in a communication system, the method comprising:

utilizing a linear decoder to filter a processed received vector to generate transmit symbol vector estimates;

generating perturbation vectors such that the perturbation vectors are randomly generated, wherein the randomly generated perturbation vectors are contained within a sphere around the estimates;

generating the processed received vectors by perturbing the received vector with the randomly generated perturbation vectors; and generating transmit symbol vector candidates which comprises:

providing transmit symbol vector estimates by individually adding the randomly generated perturbation vectors to the estimate; and providing the transmit symbol vector candidates by mapping the transmit symbol vector estimates to a constellation symbol.

11. The method of claim 10, wherein the generating of perturbation vectors comprises randomly generating vectors having a statistical nature corresponding to interference-plus-noise on the received vector.

12. The method of claim 10, wherein the generating of the processed received vectors comprises individually adding the perturbation vectors to the received vector.

13. The method of claim 10, further comprising obtaining transmit symbol vector estimates provided by filtering the processed received vectors.

14. The method of claim 13, further comprising generating transmit symbol vector candidates by mapping the transmit symbol vector estimates to a constellation symbol.

15. The method of claim 14, further comprising performing one of a hard decision decoding and a soft decision decoding for received bits, based on the transmit symbol vector candidates.

16. The method of claim 13, further comprising generating transmit symbol vector candidates by perturbing at least a subset of the transmit symbol vector estimates with post-perturbation vectors.

17. The method of claim 16, wherein the post-perturbation vectors are randomly generated vectors that, on average, are contained within a sphere around a transmit symbol vector estimate.

18. The method of claim 16, wherein the generating of the transmit symbol vector candidates comprises individually adding the at least the subset of the transmit symbol vector estimates to the post-perturbation vectors and mapping the result thereof.

19. The method of claim 16, wherein the generating of the transmit symbol vector candidates comprises:

generating post-transmit symbol vector estimates by individually adding the at least the subset of the transmit symbol vector estimates to the post-perturbation vectors; and generating the transmit symbol vector candidates by mapping the post-transmit symbol vector estimates to a constellation symbol.

20. An apparatus for receiving and/or transmitting a signal in a multiple-input multiple-output (MIMO) communication system, the apparatus comprising:

a detector; and a decoder comprising:

a module adopted to pre-process a received signal using a linear decoder to reduce the effect of interference-plusnoise on the received signal before filtering the received signal to provide transmit symbol vector estimates;

a module adopted to provide randomly generated perturbation vectors, wherein the randomly generated perturbation vectors are contained within a sphere around the estimates; and a module adopted to post-process the result of filtering the received signal comprising:

a module adopted to provide transmit symbol vector candidates by perturbing the estimate of the transmit symbol vector with the randomly generated perturbation vectors, wherein the module adopted to provide the transmit symbol vector candidates comprises:

a module adopted to provide transmit symbol vector estimates by individually adding the randomly generated perturbation vectors to the estimate; and a module adopted to provide the transmit symbol vector candidates by mapping the transmit symbol vector estimates to a constellation symbol.

21. The apparatus of claim 20, wherein the module adopted to post-process provides transmit symbol vector candidates by perturbing the result with perturbation vectors.

22. The decoder of claim 1, wherein the linear decoder is a ZF decoder or a MMSE decoder.

23. The decoder of claim 1, wherein one of the perturbation vectors is an all zeroes vector.

* * * * *